(12) United States Patent
Nakada et al.

(10) Patent No.: US 8,971,025 B2
(45) Date of Patent: Mar. 3, 2015

(54) DEVICES AND METHODS FOR ALIGNING A DISPLAY WITH A KEYBOARD

(75) Inventors: Kazuo Nakada, Sagamihara (JP); Takeo Hyodoh, Kawasaki (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 277 days.

(21) Appl. No.: 13/397,709

(22) Filed: Feb. 16, 2012

(65) Prior Publication Data

US 2013/0215565 A1    Aug. 22, 2013

(51) Int. Cl.
*H05K 5/03*    (2006.01)

(52) U.S. Cl.
USPC .................. 361/679.09; 361/679.21; 248/917

(58) Field of Classification Search
CPC ....... G06F 1/16; G06F 1/1613; G06F 1/1616; G06F 1/1626; G06F 1/1632; G06F 1/1669; G06F 3/041; G06F 1/1628; G06F 3/04883; G06F 1/1601; G06F 1/1656; G06F 1/166; G06F 3/016; G06F 3/0219; G06F 1/1607; G06F 1/1633; G06F 1/1635; G06F 1/1649; G06F 1/1662; G06F 1/1671; G06F 1/1679; G06F 1/1681; G06F 1/169; G06F 1/1692; G06F 1/181; G06F 1/203; G06F 21/74; G06F 2200/1614; G06F 2200/1633; G06F 2200/1634; G06F 3/02; G06F 3/0202; G06F 3/0231; H05K 7/16; H05K 13/00; H05K 5/0204; H05K 5/03; H05K 7/00

USPC ............ 361/679.01, 679.02, 679.21, 679.26, 361/679, 271, 679.08; 248/917–924; 345/168–172; 349/58–60
See application file for complete search history.

(56) References Cited

U.S. PATENT DOCUMENTS

| | | | |
|---|---|---|---|
| 6,590,547 B2 * | 7/2003 | Moriconi et al. | 345/30 |
| 2009/0150779 A1 | 6/2009 | Kodama et al. | |

FOREIGN PATENT DOCUMENTS

| | | | |
|---|---|---|---|
| JP | 06059772 A | 3/1994 | |
| JP | 2011034207 A | 2/2011 | |

* cited by examiner

*Primary Examiner* — Anthony Haughton
*Assistant Examiner* — Ingrid Wright
(74) *Attorney, Agent, or Firm* — Nutter McClennen & Fish LLP; John J. Penny, V.

(57) ABSTRACT

Methods and devices are provided for aligning a display with a keyboard. In one exemplary embodiment, a device is provided that includes a lid and a based hingedly connected together to allow the computing device to be opened and closed. When the device is opened, the lid can be configured to automatically move relative to the base. In this way, a display included in the lid can be moved relative to a keyboard included in the base to align to display and the keyboard in an optimal orientation relative to one another, e.g., with the display centered relative to a center of an alphanumeric portion of the keyboard.

8 Claims, 10 Drawing Sheets

… (1)

DEVICES AND METHODS FOR ALIGNING A DISPLAY WITH A KEYBOARD

FIELD OF THE INVENTION

The present invention relates generally to devices and methods for aligning a display with a keyboard.

BACKGROUND OF THE INVENTION

Current portable computers, e.g., laptop computers, typically include a display and a keyboard. When the computer is in a closed configuration, the display and the keyboard are "hidden" and inaccessible to facilitate portability of the computer and to help protect the display and the keyboard from damage while not in use. The computer can be moved from the closed configuration to an open configuration in which the display and the keyboard are visible and accessible to facilitate use of the computer. To move between the closed and open configurations, a lid including the display can be hingedly connected to a base including the keyboard. The hinged connection can allow the lid and the base to open and close in a "clam shell" manner.

One drawback with current portable computers is that the hinged connection between the lid and the base maintains centers of the lid and the base in a fixed position relative to one another regardless of whether the computer is in the open configuration or the closed configuration. A center of the display and a center of the keyboard can therefore be offset from one another. More particularly, the display can have a longitudinal edge and a latitudinal edge, where the longitudinal edge is longer than the latitudinal edge. Similarly, the keyboard can have a longitudinal edge and a latitudinal edge, where the longitudinal edge is longer than the latitudinal edge. The longitudinal centers of the display and the keyboard can be offset from one another in conventional portable computers. Such an offset can make typing on the keyboard more difficult, particularly in the case of touch typing in which hands typing on the keyboard will be offset from the center of the display and therefore be more likely to inaccurately type on the keyboard while the offset display is being viewed. Such an offset can additionally or alternatively cause eye strain and/or awkward, uncomfortable body position as a person's body, e.g., hands, arms, neck, etc., can be unnaturally positioned to try compensate for the offset between the display and the keyboard.

Accordingly, there remains a need for improved devices and methods for aligning a display of a computer with a keyboard of the computer.

SUMMARY OF THE INVENTION

In one embodiment, a device is provided that includes a lid and a base. The lid includes a display on an inner surface thereof, and the lid has a longitudinal side and a latitudinal side. The base includes a keyboard on an inner surface thereof, and the base has a longitudinal side and a latitudinal side. The keyboard includes an alphanumeric keypad and a numeric keypad. The numeric keypad is located to a side of the alphanumeric keypad in a longitudinal direction. The base and the lid are hingedly connected along the longitudinal sides such that the lid and the base can be moved between a closed configuration and an open configuration. The lid is configured to automatically move in a longitudinal direction relative to the base between a first position in which a central latitudinal axis of the display is offset from a central latitudinal axis of the alphanumeric keypad and a second position in which the central latitudinal axis of the display is coaxial with the central latitudinal axis of the alphanumeric keypad. The lid can be configured to be in the second position when the lid and the base are in the closed configuration, and the lid can be configured to be in the first position when the lid and the base are in the open configuration.

The central latitudinal axis of the alphanumeric keypad can be offset from a central latitudinal axis of the base. When the base and the lid are in the closed configuration, the central latitudinal axis of the base can be coaxial with the central latitudinal axis of the display. When the base and the lid are in the open configuration, the central latitudinal axis of the base can be offset from the central latitudinal axis of the display.

The lid can be configured to mechanically move automatically between the first and second positions without using electrical power. In some embodiments, the lid can be configured to mechanically move automatically between the first position and a third position that is between the first and second positions, and the lid can be configured to be mechanically manually moved between the second and third positions. The third position can be substantially halfway between the first and second positions.

In another embodiment, a device is provided that includes a lid, a base, and a sliding mechanism. The lid includes a display on an inner surface thereof, and the lid has a longitudinal side and a latitudinal side. The base includes a keyboard on an inner surface thereof, and the base has a longitudinal side and a latitudinal side. The base and the lid are hingedly connected along the longitudinal sides such that the lid and the base can be moved between a closed configuration and an open configuration. The keyboard includes an alphanumeric keypad and a numeric keypad. The numeric keypad is located to a side of the alphanumeric keypad in a longitudinal direction. The sliding mechanism is configured to automatically mechanically move the lid in a longitudinal direction relative to the base when the lid and the base are moved between the open and closed configurations. The sliding mechanism is also configured to automatically mechanically move the lid in the longitudinal direction between a first position in which a central latitudinal axis of the display is offset from a central latitudinal axis of the alphanumeric keypad and a second position in which the central latitudinal axis of the display is coaxial with the central latitudinal axis of the alphanumeric keypad.

The sliding mechanism can have a variety of configurations. For example, the sliding mechanism can include a torque shaft having a groove formed therein, a cam configured to move within the groove, and a bias element configured to move between a compressed configuration and an expanded configuration. The bias element moving from the compressed configuration to the expanded configuration can cause the cam to move within the groove in a first direction and can cause the lid to move from the first position to the second position. The bias element moving from the expanded configuration to the compressed configuration can allow the cam to move within the groove in a second direction opposite to the first direction and can allow the lid to move from the second position to the first position. The device can include a push button configured to be manually pushed to move the bias element from the compressed configuration to the expanded configuration.

The groove formed in the torque shaft can include a variety of configurations. In one embodiment, the groove can include a linear portion extending linearly along the torque shaft, and the cam can be configured to move within the linear portion in the first and second directions. In another embodiment, the groove can include a spiral portion that spirals around an exterior surface of the torque shaft, and the cam can be configured to move within the spiral portion in the first and second directions.

The device can also include a release mechanism configured to move between a locked configuration and a released configuration. The release mechanism can be in the locked configuration when the lid and the base are in the closed configuration, and the release mechanism can be in the released configuration when the lid and the base are in the open configuration. When the lid and the base are moved from the closed configuration to the open configuration, the release mechanism can be configured to move from the locked configuration to the released configuration to cause the sliding mechanism to automatically mechanically move the lid in the longitudinal direction relative to the base.

The release mechanism can have a variety of configurations. For example, the release mechanism can include a protrusion configured to be disposed within an opening formed in the base when the release mechanism is in the locked configuration and configured to be released from the opening when the release mechanism is in the released configuration. The release mechanism can also include a link shaft having the protrusion extending therefrom. The link shaft can be configured to slide within the base to move the protrusion between being disposed within the opening and being released from the opening. The release mechanism can also include a push button configured to be manually pushed to slide the link shaft within the base and move the lid and the base from the closed configuration to the open configuration.

In another aspect of at least one embodiment of the invention, a method is provided that includes hingedly opening a computing device having a hinged connection between longitudinal sides of a lid of the computing device and a base of the computing device. The lid includes a display on an inner surface thereof, and the base includes a keyboard on an inner surface thereof. The opening automatically causes the lid to move in a longitudinal direction relative to the base from a first position in which a central latitudinal axis of the display is offset from a central latitudinal axis of the keyboard to a second position in which the central latitudinal axis of the display is coaxial with the central latitudinal axis of the keyboard.

The method can have any number of variations. For example, the method can also include hingedly closing the computing device. The closing can automatically cause the lid to move in a longitudinal direction relative to the base from the second position to the first position. The lid can automatically move between the first and second positions mechanically without use of electrical power.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
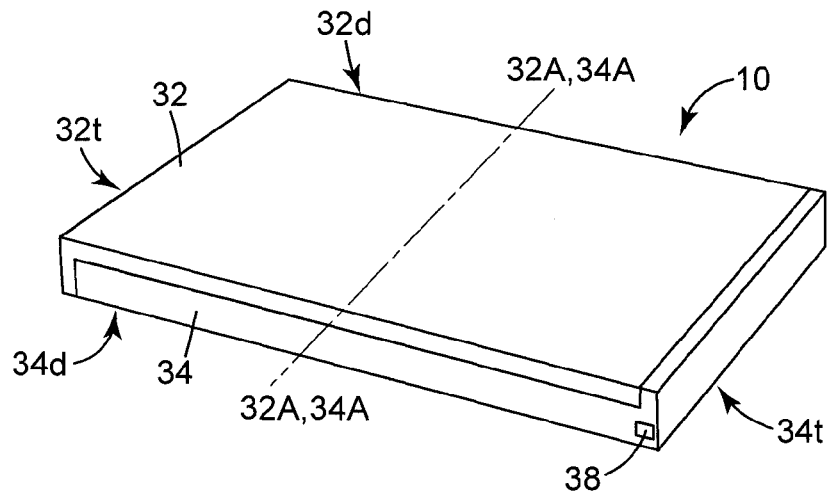
FIG. 1 is a schematic view of one embodiment of a portable computing device in a closed position.

Certain exemplary embodiments will now be described to provide an overall understanding of the principles of the structure, function, manufacture, and use of the devices and methods disclosed herein. One or more examples of these embodiments are illustrated in the accompanying drawings. Those of ordinary skill in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Various exemplary methods and devices are provided for aligning a display with a keyboard. In general, the methods and devices can allow a display and a keyboard of a computing device to be automatically aligned. In one embodiment, a computing device can include a lid and a based hingedly connected together to allow the computing device to be opened and closed. When the computing device is opened, the lid can be configured to automatically move relative to the base. In this way, a display included in the lid can be moved relative to a keyboard included in the base to align to display and the keyboard in an optimal orientation relative to one another. In an exemplary embodiment, the display can be automatically centered relative to a center of an alphanumeric portion of the keyboard. The display and the keyboard being automatically aligned with one another can help ensure that the keyboard and the display are consistently in an optimal position relative to one another when the computing device is in use. A user can more accurately type on the keyboard, particularly when touch typing, when center lines of the display and the keyboard are aligned. The user can experience less eye fatigue when center lines of the display and the keyboard are aligned because the user's eyes need not shift in an offset manner between the keyboard and the display. Similarly, the user can be less likely to have an awkward, uncomfortable body position when center lines of the display and the keyboard are aligned because the user's body, e.g., hands, arms, neck, etc., are less likely to be unnaturally positioned to try compensate for an offset between center lines of the display and the keyboard.

A person skilled in the art will appreciate that the devices and methods disclosed herein can be implemented using a computing device including a display. The term "computing device" as used herein refers to any of a variety of digital data processing devices, e.g., laptop or notebook computers, tablet computers, server computers, cell phones, PDAs, gaming systems, televisions, radios, portable music players, and the like. In an exemplary embodiment, the computing device is portable, although the computing device can be stationary. The term "display" as used herein refers to any of a variety of display devices, e.g., a liquid crystal display (LCD), a light-emitting diode (LED) screen, a cathode ray tube (CRT) screen, a touchscreen, a 3D screen, and the like. Additionally, the term "display" as used herein can refer to a display that is fixedly mounted in the same chassis or package as a base of a computing device, as well as to displays that are removably and replaceably mounted to the same chassis or package as a base of a computing device.

FIGS. 1-4 illustrate one exemplary embodiment of a computing device 10 configured to align a display 12 of the device 10 with a keyboard 14 of the device 10. Although the device 10 in this illustrated embodiment includes a laptop or notebook computer, as mentioned above, other embodiments can include other types of computing devices. The device 10 can include any of a variety of software and/or hardware components. In addition, although an exemplary device 10 is depicted and described herein, a person skilled in the art will appreciate that this is for sake of generality and convenience. In other embodiments, the computing device may differ in architecture and operation from that shown and described with respect to any of the illustrated embodiments. Additional information on computer systems can be found in U.S. Patent Publication No. 2009/0150779 entitled "Method And Apparatus For Displaying Help Information" filed Dec. 5, 2008, which is hereby incorporated by reference in its entirety.

Figure 4:
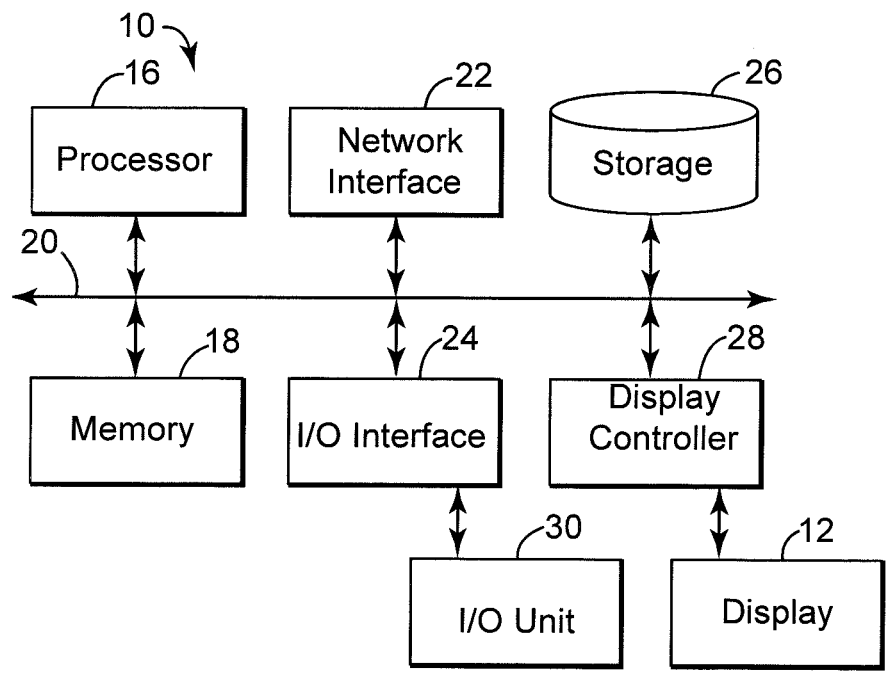
FIG. 4 is a block diagram representation of a computing system of the device of FIG. 1.

As shown in FIG. 4, the illustrated device 10 includes a processor 16 which controls the operation of the device 10, for example by executing an operating system (OS), a basic input/output system (BIOS), device drivers, application programs, and so forth. The processor 16 can include any type of microprocessor or central processing unit (CPU), including programmable general-purpose or special-purpose microprocessors and/or any one of a variety of proprietary or commercially-available single or multi-processor systems. The device 10 also includes a memory 18, which can provide temporary storage for code to be executed by the processor 16 or for data that is processed by the processor 16. The memory 18 can include read-only memory (ROM), flash memory, one or more varieties of random access memory (RAM), and/or a combination of memory technologies. The various elements of the device 10 are coupled to a bus system 20. The illustrated bus system 20 is an abstraction that represents any one or more separate physical busses, communication lines/interfaces, and/or multi-drop or point-to-point connections, connected by appropriate bridges, adapters, and/or controllers.

The device 10 also includes a network interface 22, an input/output (I/O) interface 24, a storage device 26, and a display controller 28. The network interface 22 can enables the device 10 to communicate with remote devices, e.g., other computing devices, over a network. The I/O interface 24 can facilitate communication between one or more I/O units 30. A person skilled in the art will appreciate that the device 10 can be configured to communicate with a variety of I/O units 30. Non-limiting examples of input units include the keyboard 14, a touch screen, a mouse, and a pointing device. Non-limiting examples of output units includes a speaker, a printer, a scanner, a removable memory, and the various other components of the device 10. The storage device 26 can include any conventional medium for storing data in a non-volatile and/or non-transient manner. The storage device 26 can thus hold data and/or instructions in a persistent state, i.e., the value is retained despite interruption of power to the device 10. The storage device 26 can include one or more hard disk drives, flash drives, universal serial bus (USB) drives, optical drives, various media disks or cards, and/or any combination thereof, and can be directly connected to the other components of the device 10 or remotely connected thereto, such as over a network. The display controller 28 can include a video processor and a video memory, and can generate images to be displayed on the display 12 in accordance with instructions received from the processor 16.

One or more software modules can be executed by the device 10 to facilitate human interaction with the device 10. These software modules can be part of a single program or one or more separate programs, and can be implemented in a variety of contexts, e.g., as part of an operating system, a device driver, a standalone application, and/or combinations thereof. A person skilled in the art will appreciate that any software functions disclosed herein as being performed by a particular software module can also be performed by any other module or combination of modules.

The device 10 can be configured to open and close in a clamshell manner. A lid 32 of the device 10 and a base 34 of the device 10 can be configured to move between a closed configuration, shown in FIG. 1, and an open configuration, shown in FIGS. 2 and 3. The lid 32 can include the display 12 on an inner surface thereof, and the base 18 can include the keyboard 14 on an inner surface thereof. In this way, the display 12 and the keyboard 14 can be "hidden" when the device 10 is closed, which can help protect the display 12 and the keyboard 14 from damage when not in use.

As in the illustrated embodiment, the device 10 can include a lid 32 hingedly connected to a base 34 to allow the device 10 to be hingedly opened and closed, as will be appreciated by a person skilled in the art. As in the illustrated embodiment, the lid 32 can have a rectangular shape and include opposed first and second longitudinal sides 32d and opposed first and second latitudinal sides 32d. Similarly, the base 34 can have a rectangular shape and include opposed first and second longitudinal sides 34d and opposed first and second latitudinal sides 34d. The first longitudinal side 32d of the lid 32 and the first longitudinal side 34d of the base 34 can be hingedly connected together to allow the device 10 to be opened and closed. Although in the illustrated embodiment the longitudinal sides 32d of the lid 32 have a greater length than the latitudinal sides 32t of the lid 32, and the longitudinal sides 34d of the base 34 have a greater length than the latitudinal sides 34t of the base 34, the lid 32 and/or the base 34 can have latitudinal sides having greater lengths than its longitudinal sides.

Figure 2:
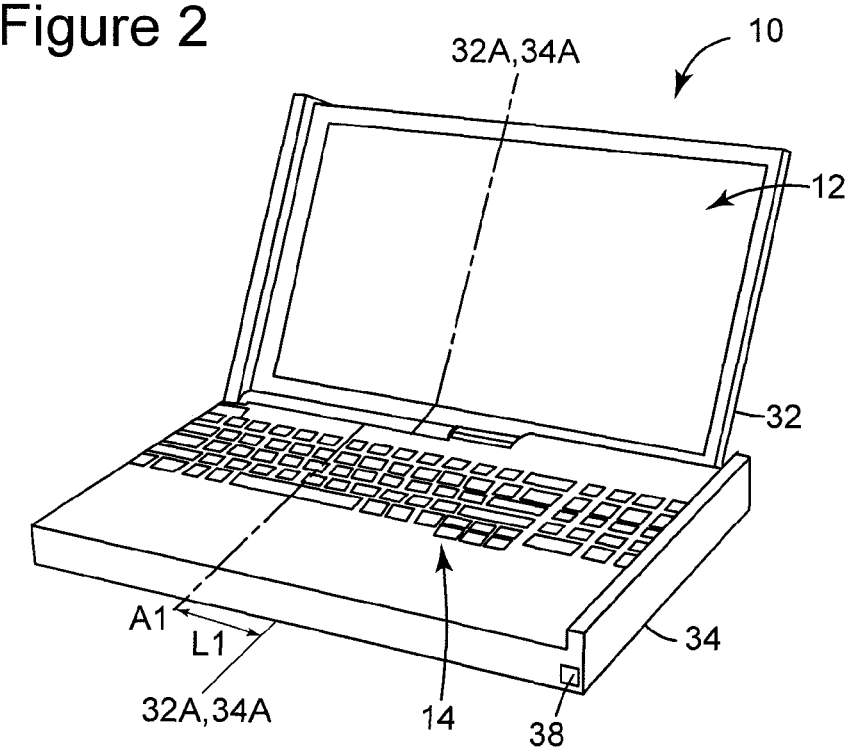
FIG. 2 is a schematic view of the device of FIG. 1 in an open position with a display of the device offset from an alphanumeric keypad of the device.
Figure 3:
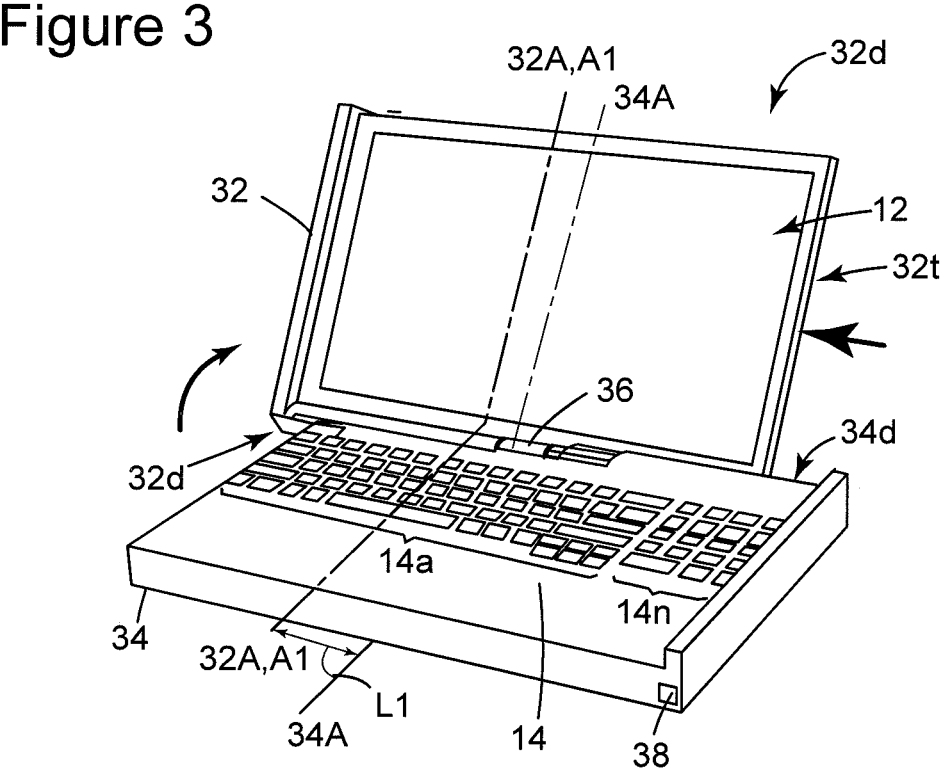
FIG. 3 is a schematic view of the device of FIG. 1 in an open position with the display of the device coaxially aligned with the alphanumeric keypad of the device.

When the device 10 is closed, e.g., when the lid 32 and the base 34 are in the closed configuration, as shown in FIG. 1, a central latitudinal axis 32A of the lid 32 and a central latitudinal axis 34A of the base 34 can be coaxial. When the device 10 is open, e.g., when the lid 32 and the base 34 are in the open configuration, as shown in FIG. 3, the central latitudinal axis 32A of the lid 32 can be offset from the central latitudinal axis 34A of the base 34, e.g., can no longer be coaxial. The lid 32 can be configured to move relative to the base 34 to offset the central latitudinal axes 32A, 34A, as discussed further below. For purposes of illustrative clarity, FIG. 2 shows the device 10 in the open configuration with the central latitudinal axes 32A, 34A being coaxial. In this illustrated embodiment, however, the lid 32 is configured to automatically move relative to the base 34 when the device 10 is opened such that the device 10 does not take the form of FIG. 2 in which the central latitudinal axes 32A, 34A are coaxial. In some embodiments, discussed further below, a computing device can be configured to have central latitudinal axes of its lid and base be coaxial when the device is open and when the device is closed.

As mentioned above, the inner surface of the lid 32 can have the display 12 thereon, e.g., on a surface that faces the base 34 and the keyboard 14 when the device 10 is closed. Although the display 12 in this illustrated embodiment is rectangular and is centered latitudinally and longitudinally on the inner surface of the lid 32, the display 12 can have any shape and can have its center latitudinally and/or longitudinally offset from a center of the lid 32. Because the display 12 in this illustrated embodiment is centered longitudinally on the inner surface of the lid 32, the central latitudinal axis 32A of the lid 32 is also a central latitudinal axis of the display 12.

As will be appreciated by a person skilled in the art, the lid 32 can include any number of elements in addition to the display 12. Non-limiting examples of elements that can be included in the lid 32 are one or more additional displays, a sliding mechanism (discussed further below), a power control (e.g., a button, a switch, etc.), a port (e.g., a USB port, a FireWire port, an Ethernet port, etc.), a close or lock latch to help hold the device 10 closed, a parameter control (e.g., brightness, contrast, etc.), etc.

In the illustrated embodiment, the base 34 includes the processor 16, the memory 18, the bus system 20, the network interface 22, the I/O interface 24, the storage device 26, and the display controller 28 illustrated in FIG. 4. In other embodiments, as will be appreciated by a person skilled in the art, any one or more of the processor 16, the memory 18, the bus system 20, the network interface 22, the I/O interface 24, the storage device 26 can be included in the lid 32 or can be located external to the lid 32 and the base 34, e.g., an external storage device plugged into a USB port, etc.

As mentioned above, the inner surface of the base 34 can have the keyboard 14 thereon, e.g., on a surface that faces the lid 32 and the display 12 when the device 10 is closed. The keyboard 14 can include an alphanumeric keypad 14a and a numeric keypad 14n. As in the illustrated embodiment, the alphanumeric keypad 14a and the numeric keypad 14n can be side by side in a longitudinal direction with the numeric keypad 14n being located to the right of the alphanumeric keypad 14a. As also shown in the illustrated embodiment in FIGS. 2 and 3, the central latitudinal axis 34A of the base 34 can be offset by a longitudinal distance L1 from a central latitudinal axis A1 of the alphanumeric keypad 14a. The longitudinal distance L1 between the central latitudinal axis 34A of the base 34 and the central latitudinal axis A1 of the alphanumeric keypad 14a can vary depending on, e.g., the size of the keys, a longitudinal distance between the alphanumeric and numeric keypads 14a, 14n, etc. The central latitudinal axis A1 of the alphanumeric keypad 14a can be offset from the central latitudinal axis 34A of the base 34 whether the device 10 is open or closed because the keyboard 14 can be configured to remain in a same, fixed position in the base 14 whether the lid 32 and the base 34 are in the open configuration or in the closed configuration.

Figure 5:
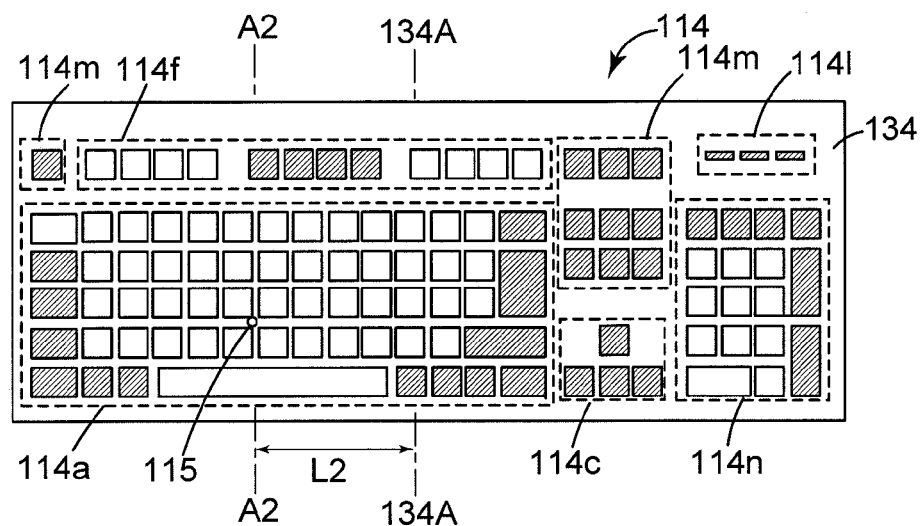
FIG. 5 is a top view of one embodiment of a keyboard included in a base of a computing device.

As will be appreciated by a person skilled in the art, the keyboard's layout can vary in any number of ways, e.g., the alphanumeric keypad being to the right of the numeric keypad; the keyboard including function keys, e.g., in a longitudinal row above the alphanumeric keypad; and/or the keyboard including cursor control keys; the keyboard including language input keys; the keyboard including multimedia keys (e.g., volume control, web browser launcher, etc.); etc. FIG. 5 illustrates another embodiment of a keyboard 114 including an alphanumeric keypad 114a, a numeric keypad 114n, function keys 114f, cursor keys 114c, miscellaneous keys 114m (e.g., Page Up, Page Down, Home, End, Insert, Delete, Esc, Scroll Lock, etc.), and on/off indicator lights 114l (e.g., Caps Lock, Num Lock, Scroll Lock, etc.). In this illustrated embodiment, a central latitudinal axis 134A of a base 134 including the keyboard 114 is offset from a central latitudinal axis A2 of the alphanumeric keypad 114a by a longitudinal distance L2.

Figure 6:
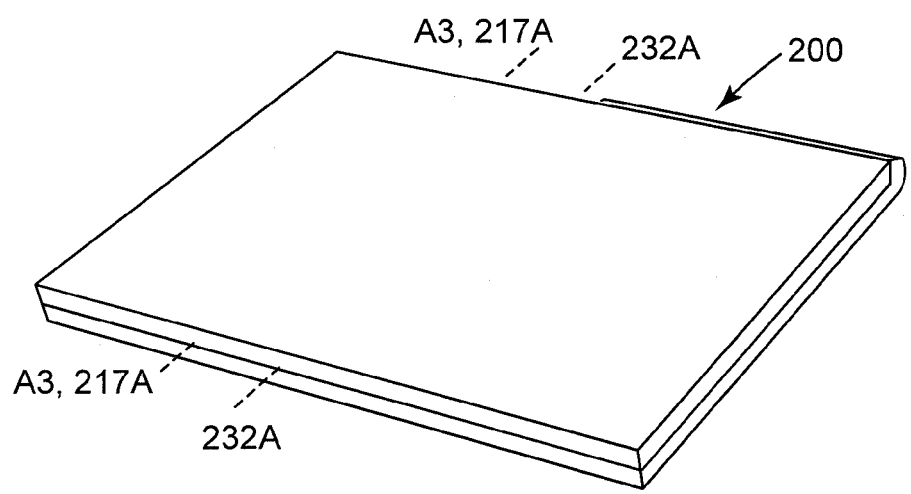
FIG. 6 is a schematic view of another embodiment of a portable computing device in a closed position.
Figure 7:
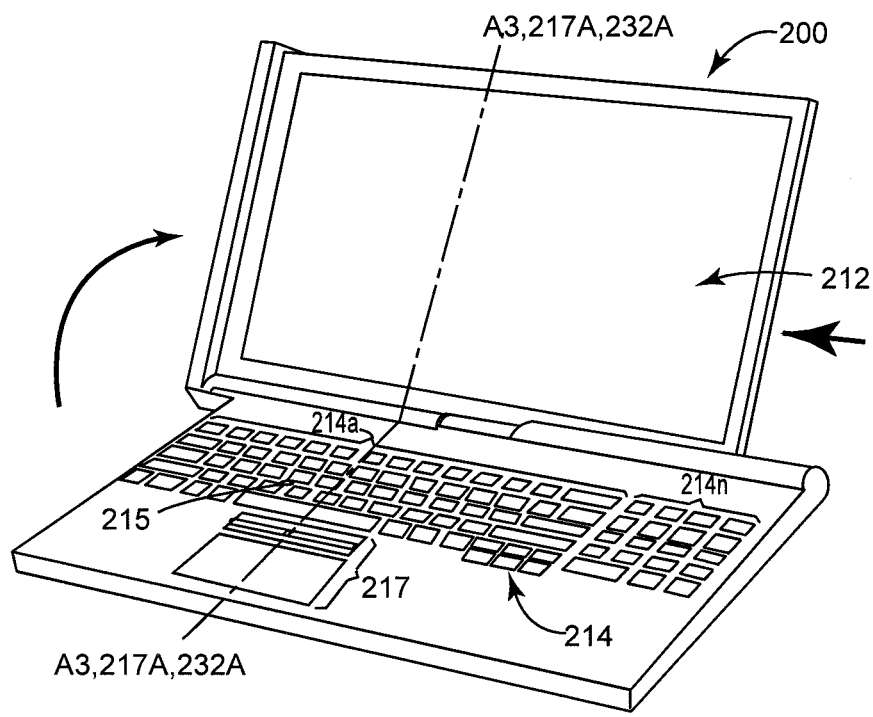
FIG. 7 is a schematic view of the device of FIG. 6 in an open position with a display of the device coaxially aligned with an alphanumeric keypad of the device.

A base of a computing device can include any number of elements in addition to a keyboard. Non-limiting examples of elements that can be included in the base are a release mechanism (discussed further below), a sliding mechanism (discussed further below), a pointing stick, a touchpad or trackpad, a media drive (e.g., a disk drive, a DVD drive, etc.), a port (e.g., a USB port, a FireWire port, an Ethernet port, etc.), a power control (e.g., a button, a switch, etc.), a WiFi network switch, a power cord outlet, a close or lock latch to help hold the device 10 closed, etc. If a keyboard includes a pointing stick, the pointing stick can be positioned in the base so as to coaxially align with a display. The base 114 of FIG. 5 includes a pointing stick 115, which, as in the illustrated embodiment, can be positioned such that the central latitudinal axis A2 of the alphanumeric keypad 114a passes through the pointing stick 115. In this way, when the central latitudinal axis A2 of the alphanumeric keypad 114a is coaxially aligned with a central latitudinal axis of a display, as discussed further below, the pointing stick 115 and the alphanumeric keypad 114a can both be centered with respect to the display. Similarly, if a computing device includes a touchpad or trackpad 217, such as in an embodiment of a computing device 200 illustrated in FIGS. 6 and 7, a central latitudinal axis A3 of an alphanumeric keypad 214a of a keyboard 214 can pass through the touchpad or trackpad 217 such that, when the device 200 is open, a central latitudinal axis 217A of the touchpad or trackpad 217 can be coaxial with the central latitudinal axis A3 of the keyboard's alphanumeric keypad 214a. In this way, when the central latitudinal axis A3 of the alphanumeric keypad 214a is coaxially aligned with a central latitudinal axis 232A of a display 212, as shown in FIG. 7, the touchpad or trackpad 217 and the alphanumeric keypad 214a can both be centered with respect to the display 212. FIG. 7 also shows a pointing device 215 coaxial with the touchpad or trackpad 217 and shows a numeric keypad 214n of the keyboard 214 to a right side of the alphanumeric keypad 214a.

Referring again to the device 10 of FIGS. 1-4, as mentioned above, the device 10 can be configured to automatically align the display 12 and the keyboard 14 in an optimal position relative to one another. In other words, the device 10 can be configured to automatically change between an unaligned configuration in which the central latitudinal axis 32A of the display 12 and the central latitudinal axis A1 of the alphanumeric keypad 14a of the keyboard 14 are offset from one another, e.g., as in FIGS. 1 and 2, and an aligned configuration in which the central latitudinal axis 32A of the display 12 and the central latitudinal axis A1 of the alphanumeric keypad 14a of the keyboard 14 are coaxially aligned, e.g., as in FIG. 3.

The device 10 can include a sliding mechanism and a release mechanism configured to cooperate with one another to automatically align the display 12 and the keyboard 14 in an optimal position relative to one another. The sliding mechanism can be configured to automatically move the lid 32, and hence the display 12, in a longitudinal direction relative to the base 34, and hence the keyboard 14, when the lid 32 and the base 34 are moved between the open and closed configurations. The release mechanism can be configured to actuate the sliding mechanism to cause the sliding mechanism to move the lid 32 in the longitudinal direction relative to the base 34. The release mechanism can also be configured such that the actuation of the actuator that causes the sliding mechanism to move the lid 32 also allows the device 10 to be opened, e.g., unlocks or releases the lid 32 from the base 34 such that the device 10 can be hingedly opened in a clamshell manner. In this way, the device 10 can be configured to automatically align the display 12 and the keyboard 14 in an optimal position relative to one another when the device 10 is opened. As discussed further below, the sliding mechanism and the release mechanism can be mechanical such that the central latitudinal axes 32A, A1 of the display 12 and alphanumeric keypad 14a of the keyboard 14 can be automatically mechanically moved between being coaxially aligned and being offset from one another without using electrical power. As also discussed further below, the lid 32 and the base 34 can each include various mechanical elements of the sliding mechanism and the release mechanism.

Generally, the sliding mechanism and the release mechanism can be located to a side of the device 10 opposite from a direction that the sliding mechanism is configured to move the lid 32 relative to the base 34. As in the illustrated embodiment, the sliding mechanism and the release mechanism can be located on a right side of the device 10, and the sliding mechanism can be configured to move the display 32 left relative to the base 34, e.g., away from the right side of the device 10. In other embodiments, the arrangement can be reversed, with a sliding mechanism and a release mechanism being located on a left side of a computing device, and the sliding mechanism being configured to move a display of the device right relative to a base of the device, e.g., away from the left side of the device.

The sliding mechanism and the release mechanism can each have a variety of configurations. As in the illustrated embodiment shown in FIGS. 1-3, the sliding mechanism can include a torque shaft 36, a cam (obscured in FIGS. 1-3), and a bias element (FIGS. 1-3). The torque shaft 36, the cam, and the bias element can each have a variety of configurations. As in the illustrated embodiment, the torque shaft 36 can include an elongate, solid cylindrical rod, although the torque shaft 36 can have a variety of other shapes and can have one or more hollow portions. As discussed further below, the torque shaft 36 can have a groove, channel, or track, generally referred to herein as a "groove," formed therein that can be configured to engage the cam. The cam can include an element configured to slidably move within the groove formed in the torque shaft 36, such as an elongate, solid cylindrical rod although the cam can have a variety of other shapes and can have one or more hollow portions. The bias element can include an element configured to provide a biasing force to the torque shaft 36, such as a compression spring, an elastic member such as an elastic band or an elastic rod, a shape memory material member, a volute spring, etc.

The release mechanism can include a link shaft (obscured in FIGS. 1-3) and an actuator, which in this illustrated embodiment includes a push button 38. The actuator can have a variety of other configurations, such as a switch, a pull tab, a key/lock, etc. The link shaft can also have a variety of configurations. The link shaft can include an element configured to hold or lock the lid 32 and the base 34 in a closed configuration until the actuator is actuated, thereby allowing the device 10 to be hingedly opened. As discussed further below, the link shaft can include an elongate, solid rectangular rod having at least one protrusion, although the link shaft can have a variety of other shapes and can have one or more hollow portions. The at least one protrusion can be configured to releasably engage at least one depression formed in the device 10 to allow the device 10 to be selectively opened and closed.

Generally, the bias element can be configured to bias the torque shaft 36 to a position in which the central latitudinal axis 32A of the display 12 and the central latitudinal axis A1 of the alphanumeric keypad 14a of the keyboard 14 are coaxially aligned. The bias element is biased in the device 10 as shown in FIG. 3. The bias element can be configured to be unbiased when the device 10 is closed such that the central latitudinal axis 32A of the display 12 and the central latitudinal axis A1 of the alphanumeric keypad 14a of the keyboard 14 are offset from one another. The bias element is unbiased in the device 10 as shown in FIGS. 1 and 2. The push button 38 can be configured to be actuated, e.g., pushed, to allow the device 10 to be opened, e.g., to release the lid 32 from the base 34 such that the device 10 can be hingedly opened in a clamshell manner. The actuator can also be configured such that pushing the push button 38 to allow the device 10 to be opened also allows the bias element to move from the unbiased configuration to the biased configuration, thereby allowing the bias element to move the torque shaft 36, and hence the lid 32 including the display 12, in a longitudinal direction.

As shown in FIG. 3, when the central latitudinal axis 32A of the display 12 is coaxially aligned with the central latitudinal axis A1 of the alphanumeric keypad 14a, the central latitudinal axis 32A of the display 12 can be offset from the central latitudinal axis 34A of the base 14 by the longitudinal distance L1. The lid 32, and hence the display 12, can therefore be configured to move the longitudinal distance L1 relative to the base 34 to allow the central latitudinal axis 32A of the display 12 to move between being coaxially aligned with the central latitudinal axis A1 of the alphanumeric keypad 14a and being offset from the central latitudinal axis A1 of the alphanumeric keypad 14a. The sliding mechanism can therefore be configured to move the lid 32, and hence the display 12, by the longitudinal distance L1. In an exemplary embodiment, the sliding mechanism can be configured to move the lid 32, and hence the display 12, by a distance equal to or less than the longitudinal distance L1. In this way, once the lid 32 is hingedly opened relative to the base 34 beyond a threshold amount, e.g., to an extent great enough to allow typing on the keyboard 14, the display 12 can be automatically moved longitudinally by the longitudinal distance L1 to optimally align relative to the alphanumeric keypad 14a. If the lid 32 is not opened beyond the threshold amount, as discussed further below, the sliding mechanism can be configured to longitudinally move the lid 32 relative to the base 34 by a longitudinal distance less than the longitudinal distance L1.

FIGS. 8-16 illustrate another embodiment of a computing device 300 configured to mechanically automatically align a keyboard 314 of the device 300 with a display (obscured in FIGS. 8-16) of the device 300. Elements discussed herein with reference to any computing device can generally be configured similar to like-named elements discussed herein.

Figure 10:
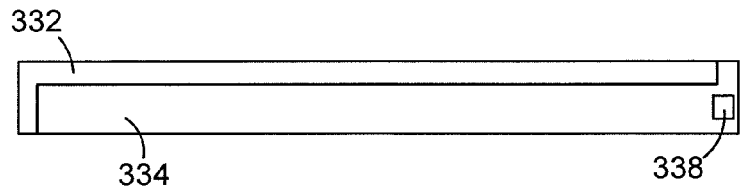
FIG. 10 is a side view of the device of FIG. 8.
Figure 11:
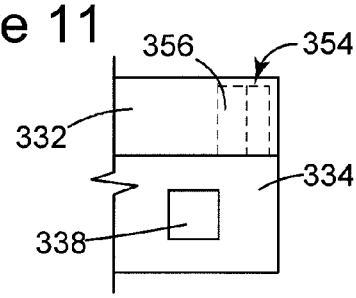
FIG. 11 is a partially transparent side view of the device of FIG. 10.
Figure 12:
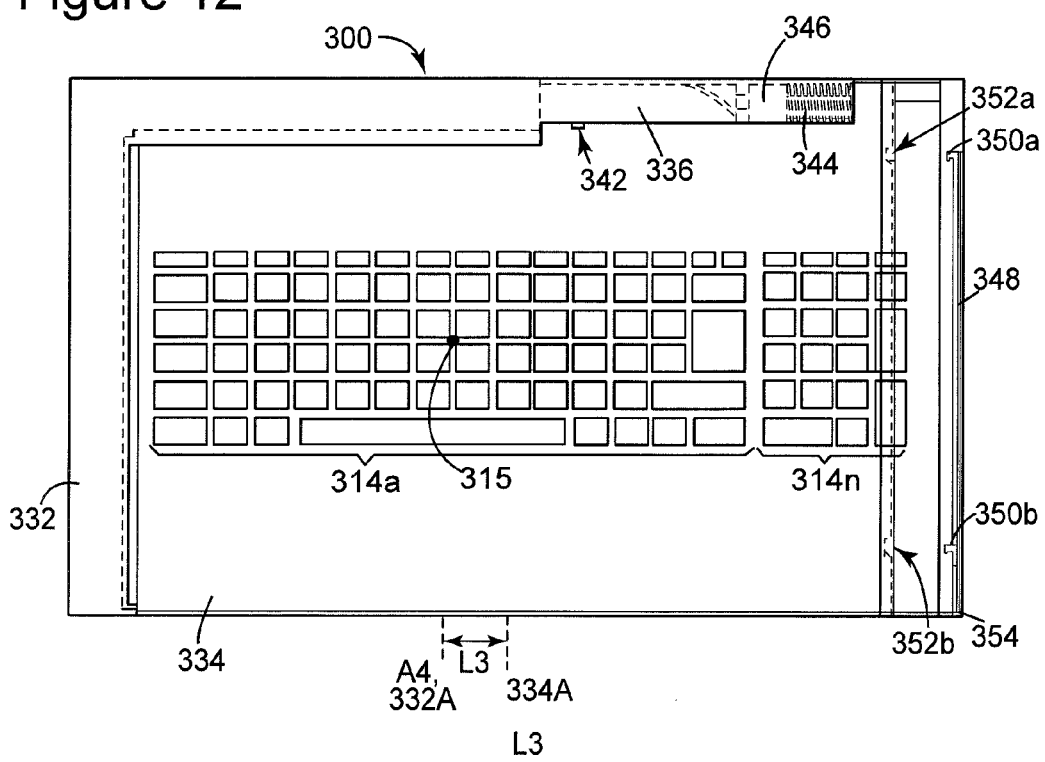
FIG. 12 is a top, partially transparent view of the device of FIG. 8 in an open position.

The device 300 is shown closed in FIGS. 8-11 with a lid 332 of the device 300 and a base 334 of the device 300 in a closed configuration. When the device 300 is closed, a central latitudinal axis 332A of the lid 332 and the display can be coaxially aligned with a central latitudinal axis 334A of the base 334, and the central latitudinal axis 332A of the lid 332 and the display can be longitudinally offset by a longitudinal distance L3 from a central latitudinal axis A4 of an alphanumeric keypad 314a of the keyboard 314. In this illustrated embodiment, the device 300 includes a pointing stick 315 aligned with the central latitudinal axis A4 of the alphanumeric keypad 314a. The device 300 is shown open in FIGS. 12-16 with the lid 332 and the base 334 in an open configuration. To facilitate comparison between relative positions of the lid 332 and the base 334 when the device 300 is open and closed, FIGS. 12-16 show the lid 332 down, whereas when the device 300 is open and the lid 332 is in the open configuration, the lid 332 would be up similar to the lid 32 shown in FIG. 3. When the device 300 is open, the central latitudinal axis 332A of the lid 332 and the display can be offset by the longitudinal distance L3 from the central latitudinal axis 334A of the base 334, and the central latitudinal axis 332A of the lid 332 and the display can be coaxially aligned with the central latitudinal axis A4 of the alphanumeric keypad 314a, as shown in FIG. 12.

Figure 8:
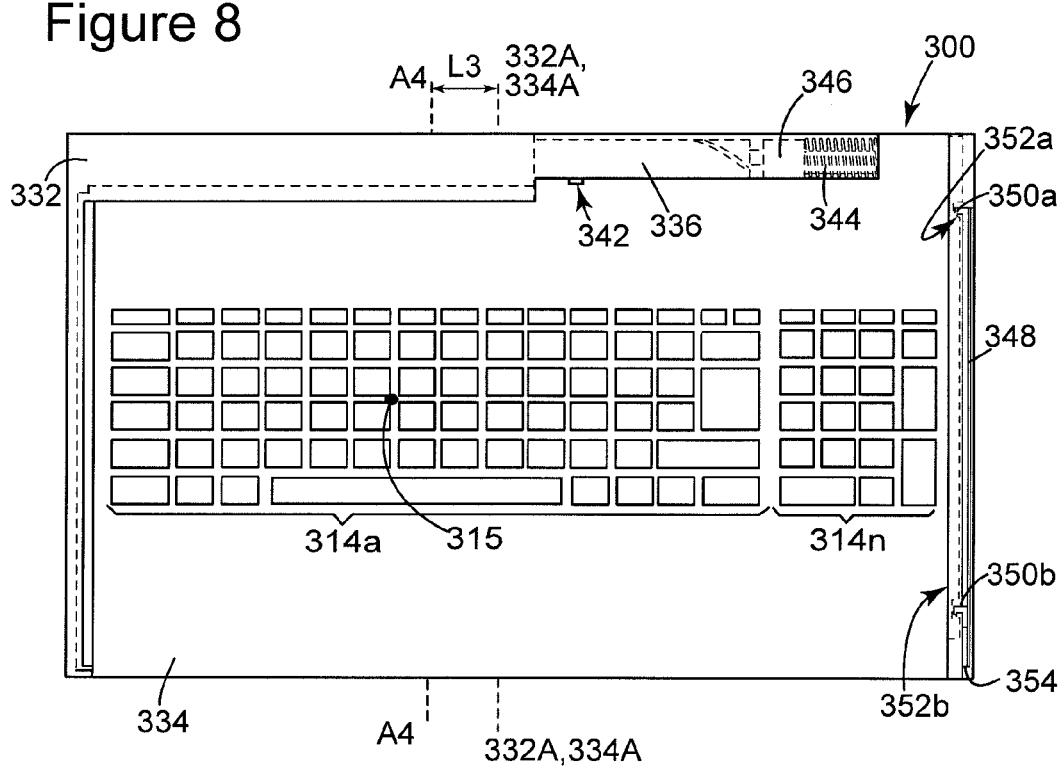
FIG. 8 is a top, partially transparent view of another embodiment of a portable computing device in a closed position.
Figure 9:
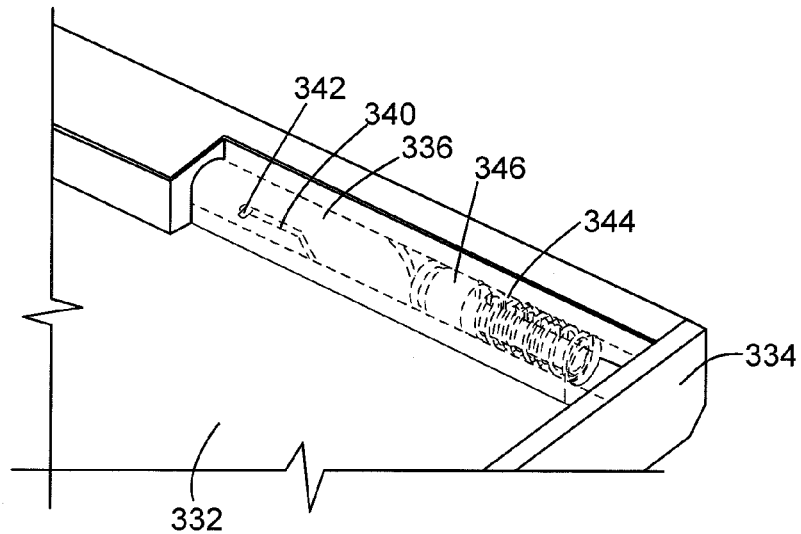
FIG. 9 is a perspective, partially transparent view of the device of FIG. 8 including a sliding mechanism.
Figure 13:
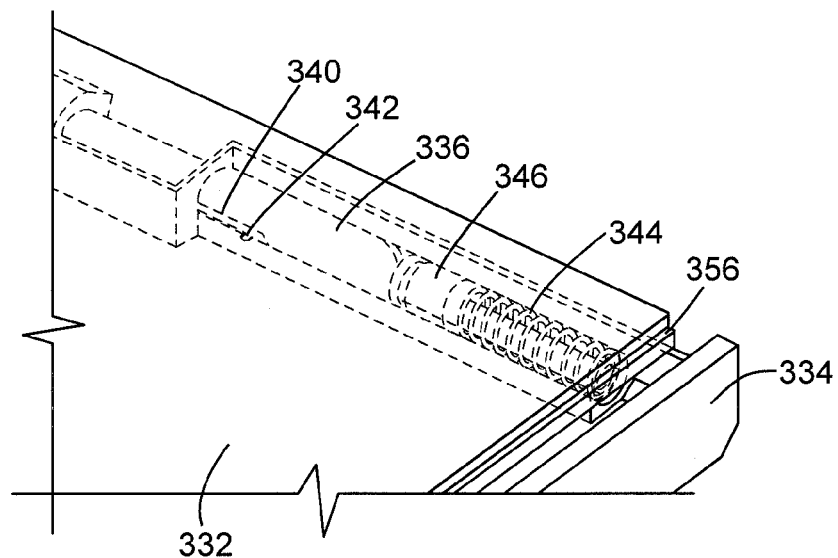
FIG. 13 is a perspective, partially transparent view of the device of FIG. 12 including the sliding mechanism of FIG. 9.

The device 300 can include a sliding mechanism and a release mechanism configured to cooperate with one another to automatically align the display and the keyboard 314 in an optimal position relative to one another. In this illustrated embodiment, as shown in FIGS. 8, 9, and 13, the sliding mechanism includes a torque shaft in the form of an elongate, solid cylindrical torque limiter 346 and an elongate, solid cylindrical rod 336 having a groove 340 formed therein, a cam 342 in the form of an elongate, solid cylindrical rod configured to slide within the groove 340, and a bias element 344 in the form of a compression spring. The groove 340 can, as in this illustrated embodiment, include a linear portion and a spiral portion that extends continuously from the linear portion. The linear portion can extend linearly along the rod 336 of the torque shaft, e.g., straight in a longitudinal direction, and the spiral portion can spiral around an exterior surface of the rod 336 of the torque shaft, e.g., coil around the torque shaft in a longitudinal direction, as shown in FIGS. 9 and 13. In other embodiments, a groove formed in a torque shaft can include only a linear portion or only a spiral portion. The cam 342 can be configured to slide within one or both of the linear and spiral portions of the groove 340. In this illustrated embodiment, the cam 342 is configured to only move within the linear portion of the groove 340, as discussed further below.

The release mechanism in this illustrated embodiment includes a link shaft 348 in the form of an elongate, solid rectangular rod having at least one protrusion 350a, 350b configured to engage at least one depression or opening 352a, 352b, generally referred to herein as a "depression," formed in the device 300, and an actuator 338 in the form of a push button 38. The link shaft 348 can be configured to slidably move relative to the base 334, e.g., slidably move back and forth in a latitudinal direction as in the illustrated embodiment. The link shaft 348 can be located entirely within the base 334, as in this illustrated embodiment where the link shaft 348 is positioned within a channel, groove, or track 354, generally referred to herein as a "channel," formed in the base 334, e.g., along a latitudinal side thereof. In other embodiments, the link shaft can be located entirely external to a base or be located partially within the base and partially external to the base. Although the link shaft 348 include two protrusions 350a, 350b each configured to releasably engage one of two depressions 352a, 352b in this illustrated embodiment, the link shaft 348 can include any number of protrusions, and the device 300 can include any number of depressions. As in this illustrated embodiment, the at least one depression 352a, 352b can be formed in the lid 332, e.g., in a latitudinal side thereof on a same side of the device 300 as a latitudinal side of the base 334 that includes the link shaft 348 therealong. The same side of the device 300 is the right side in this illustrated embodiment, but it can be either the left or the right side.

The sliding mechanism and the release mechanism can each be configured to move between first and second positions. When the device 300 is closed, the sliding and release mechanisms can each be in the first position. In the first position, the bias element 344 can be in a compressed configuration such that it stores potential force, and the torque limiter 346 and the rod 336 of the torque shaft can be pushed against the bias element 344 to help compress the bias element 344. The cam 342 can be positioned at a terminal end of the groove 340, such as at a left-most end of the groove 340 as in the illustrated embodiment. The cam 342 and the groove 340 can therefore cooperate to limit how much the torque shaft pushes against the bias element 344 because once the cam 342 abuts the terminal end of the groove 340, the rod 336 of the torque shaft cannot move any farther against the bias element 344. The protrusions 350a, 350b of the link shaft 348 can be positioned within their respective ones of the depressions 352a, 352b. The protrusions 350a, 350b can be configured as hooks, as in this illustrated embodiment, such that the protrusions 350a, 350b can be configured to hook within the depressions 352a, 352b to help hold the device 300 closed and help hold the link shaft 348 in a locked position when the release mechanism is in the first position. The lid 332 can include a lip 356 configured to seat within the channel 354 formed in the base 334, as shown in FIG. 11, which can also help hold the device 300 closed. As in the illustrated embodiment, the depressions 352a, 352b can be formed in the lip 356.

Figure 14:
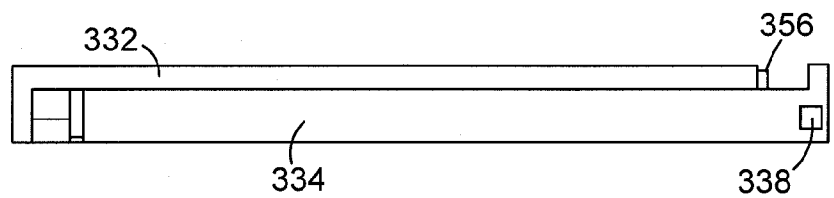
FIG. 14 is a side view of the device of FIG. 12.
Figure 15:
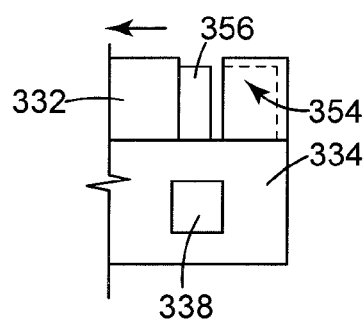
FIG. 15 is a partially transparent side view of the device of FIG. 14.

When the device 300 is open, the sliding mechanism can be in the second position. In the second position, the bias element 344 can be in an expanded configuration after having applied stored potential force to the torque limiter 346 and the rod 336 of the torque shaft to move the torque limiter 346 and the rod 336 of the torque shaft in a same direction, e.g., left, as the applied force, with the cam 342 moving through the groove 340 in an opposite direction, e.g., right. The protrusions 350a, 350b of the link shaft 348 can be released from and be located outside their respective ones of the depressions 352a, 352b, which have moved the longitudinal distance L3 with the lid 332 away from the link shaft 348 positioned within the base 334. Similarly, the lip 356 of the lid 332 can be released from and be located outside the channel 356, as shown in FIGS. 13-15.

The release mechanism can be configured to move the sliding mechanism between the first and second positions. As discussed below, in some embodiments, hingedly opening a computing device can aid the release mechanism in moving the sliding mechanism between the first and second positions.

Figure 16:
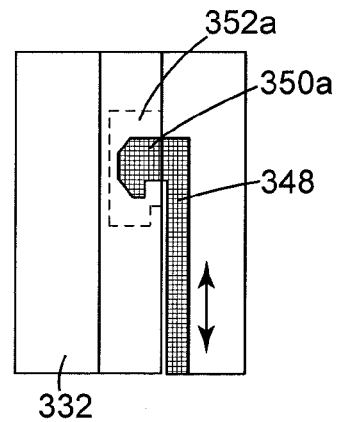
FIG. 16 is a top, partially transparent view of a release mechanism of the device of FIG. 8.

In use, when the device 300 is closed, a user can actuate the actuator of the release mechanism, e.g., push the push button 338 shown in FIGS. 10 and 11, to open the device 300. The push button 338 can be operatively connected to the link shaft 348 such that pushing the button 338 pushes the link shaft 348. FIG. 16 illustrates the link shaft 348 just after the push button 338 has been pushed, causing the link shaft 348 to be pushed laterally such that the protrusions 350a, 350b have moved within their corresponding depressions 352a, 352b. FIG. 16 shows one of the protrusions 350a having been moved within and relative to its corresponding depression 352a such that the protrusion 350a no longer hooks the lid 332, thereby freeing the lid 332 to move relative to the base 334. The lid 332 being free to move relative to the base 334 can allow the bias element 344 to move from the compressed configuration to the expanded configuration to release its stored energy and apply a force to the torque shaft. The bias element 344 can therefore move and push the torque limiter 346, which in turn can push the rod 336 and cause the cam 342 to move linearly within the groove 340. The rod 336 can correspondingly push 336 the lid 332 in a longitudinal direction by the longitudinal distance L3 to coaxially align the axes A4, 332A of the alphanumeric keypad 314a and the display. The cam 342 and the groove 340 can cooperate to help the lid 332 slide smoothly in the longitudinal direction. Once the lid 332 moves longitudinally, the protrusions 350a, 350b can be unable to hook in the depressions 352a, 352b such that the link shaft 348 can automatically move latitudinally back to an initial position it had prior to the push button 338 being pushed.

Although the sliding mechanism is configured to move the lid 332 by the longitudinal distance L3 in this illustrated embodiment, the sliding mechanism can be configured to move the lid 332 a different longitudinal distance. The longitudinal distance that the lid 332 moves can depend on the bias element 344, e.g., on how much energy the bias element 344 is configured to store and apply to the torque shaft.

When the device 300 is closed, e.g., when the lid 332 and the base 334 are moved from the open configuration to the closed configuration, the sliding mechanism and the release mechanism can function in reverse to that discussed above. Generally, the torque limiter can move and push against the bias element 344 to move the bias element 344 from the expanded configuration to the compressed configuration, with the cam 342 moving within the groove 340 in a direction opposite to its movement when the device 300 was opened. The lip 356 of the lid 332 can be received within the channel 354, and the protrusions 350a, 350a of the link shaft 348 can engage and hook within the depressions 352a, 325b.

Figure 19:
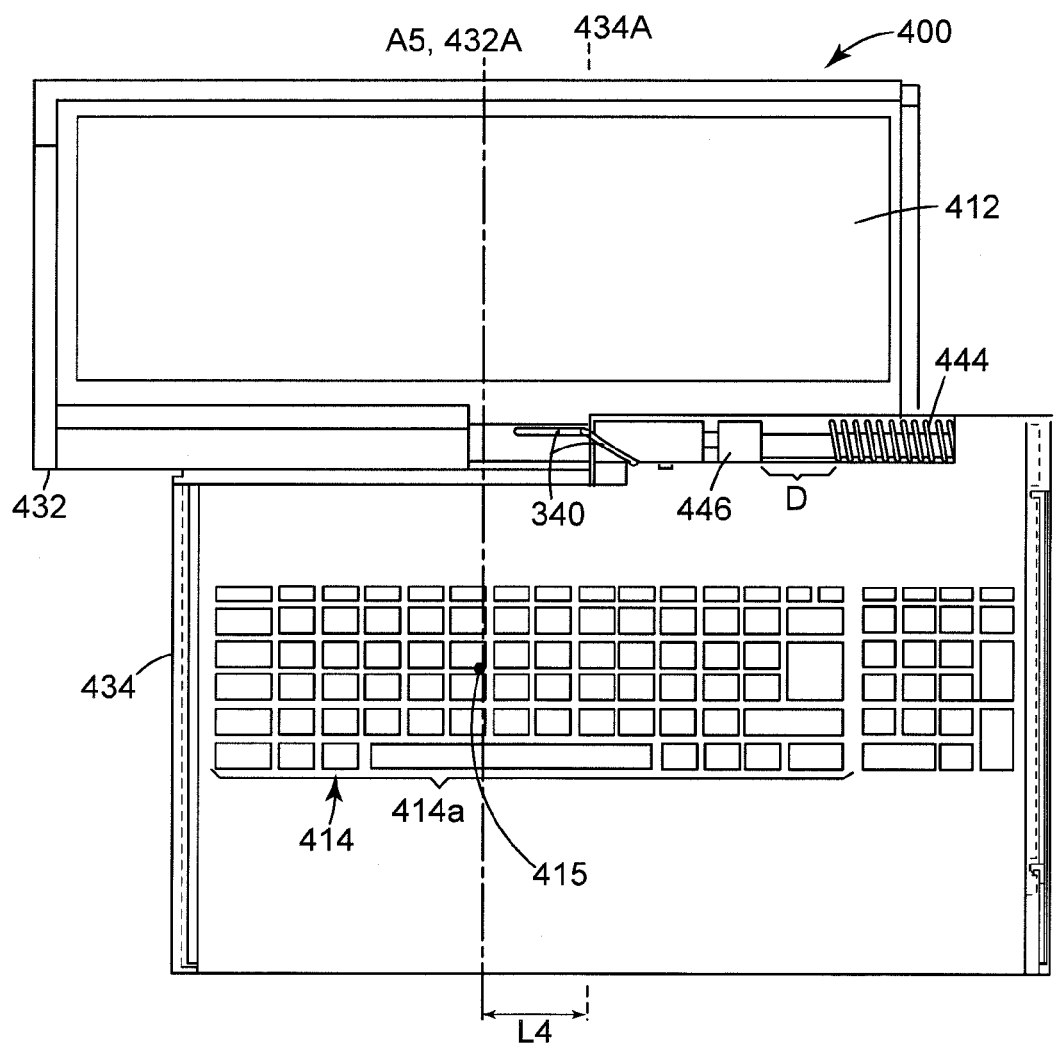
FIG. 19 is a partially transparent perspective view of the device of FIG. 17 in an open position.
Figure 20:
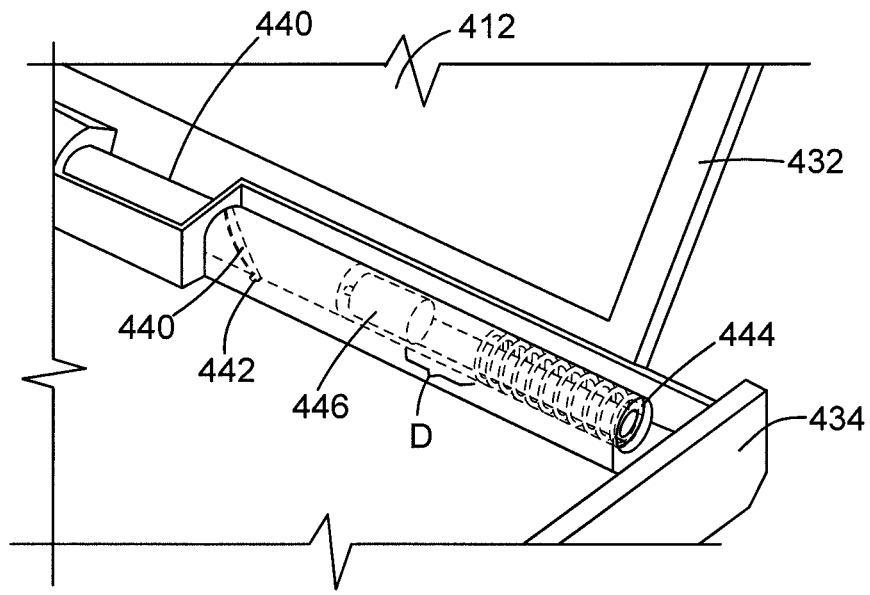
FIG. 20 is a partially transparent perspective view of a portion of the device of FIG. 19.
Figure 21:
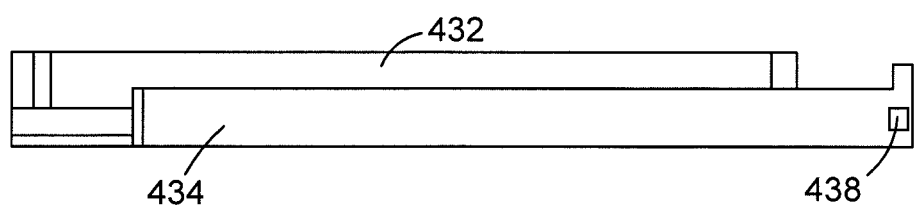
FIG. 21 is a side view of the device of FIG. 19.

FIGS. 17-21 illustrate another embodiment of a computing device 400 configured to mechanically automatically align a keyboard 414 of the device 400 with a display 412 of the device 400. When the device 400 is closed with a lid 432 of the device 400 and a base 434 of the device 400 in a closed configuration, a central latitudinal axis 432A of the lid 432 and the display 412 can be coaxially aligned with a central latitudinal axis 434A of the base 434, and the central latitudinal axis 432A of the lid 432 and the display 412 can be longitudinally offset by a longitudinal distance L4 from a central latitudinal axis A5 of an alphanumeric keypad 414a of the keyboard 414. In this illustrated embodiment, the device 400 includes a pointing stick 415 aligned with the central latitudinal axis A5 of the alphanumeric keypad 414a. The device 400 is shown partially open in FIG. 17 and open in FIGS. 19-21 with the lid 432 and the base 434 in an open configuration. To facilitate comparison between relative positions of the lid 432 and the base 434 when the device 400 is open and closed, FIG. 21 shows the lid 432 down. When the device 400 is open, the central latitudinal axis 432A of the lid 432 and the display 412 can be offset by the longitudinal distance L4 from the central latitudinal axis 434A of the base 434, and the central latitudinal axis 432A of the lid 432 and the display can be coaxially aligned with the central latitudinal axis A5 of the alphanumeric keypad 414a.

The device 400 can include a sliding mechanism and a release mechanism configured to cooperate with one another to automatically align the display 412 and the keyboard 414 in an optimal position relative to one another. In this illustrated embodiment, a portion of longitudinal movement of the display 412 relative to the keyboard 414 to optimally align the keyboard 414 and the device 412 can be provided by the sliding mechanism and the release mechanism, e.g., by a bias element 444 of the sliding mechanism, and another portion of the longitudinal movement can be provided by the act of hingedly moving the lid 432 relative to the base 434. In other words, a portion of the lid's movement by the longitudinal distance L4 can be provided by the bias element 444 first pushing a torque shaft a distance less than the distance L4, and a remaining portion of the lid's movement by the longitudinal distance L4 can then be provided by hingedly opening the lid 432 relative to the base 434. The central latitudinal axis 432A of the lid 432 and the display can therefore be automatically coaxially aligned with the central latitudinal axis A5 of the alphanumeric keypad 414a through a combination of passive action, e.g., automatic movement of the sliding and release mechanisms, and active action, e.g., manually moving the lid 432. The active action can be in a direction different from the direction in which the lid 432 moves to coaxially align the axes A5, 432A, e.g., moving the lid 432 hingedly in a latitudinal direction can move the lid 432 in a longitudinal direction, as discussed further below.

Figure 18:
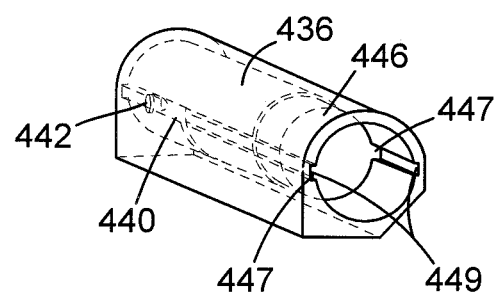
FIG. 18 is a partially transparent perspective view of a portion of a sliding mechanism of the device of FIG. 17.

In use, when the device 400 is closed, a user can actuate the actuator of the release mechanism, e.g., push a push button 438 shown in FIG. 21, to open the device 400. The lid 432 can thereby be free to move relative to the base 434 and allow the bias element 444 to move from a compressed configuration to an expanded configuration to release its stored energy and apply a force to the torque shaft. The bias element 444 can therefore move and push a torque limiter 446 of the torque shaft, which in turn can push a rod 436 of the torque shaft and cause a cam 442 to move linearly within a linear portion of a groove 440 formed in the rod 436. The rod 336 can correspondingly push 336 the lid 332 in a longitudinal direction by a first longitudinal distance less than the longitudinal distance L4. The first longitudinal distance can depend on the bias element 444, e.g., on how much energy the bias element 444 is configured to store and apply to the torque shaft. As in the illustrated embodiment, a length of the linear portion of the groove 440 can be equal to the first longitudinal distance. The cam 442 and the groove 440 can cooperate to help the lid 432 slide smoothly in the longitudinal direction. The torque limiter 446 can also help lid 432 slide smoothly in the longitudinal direction. As shown in FIG. 18, the torque limiter 446 can include at least one rail 447 configured to engage at least one channel, groove, or track 449, generally referred to herein as a "track," formed in the base 434. Although the device 400 includes two rails 447 and two tracks 449 in this illustrated embodiment, a computing device can include any number of rails and any number of tracks. The at least one rail 447 and the at least one track 449 can extend longitudinally, which can help guide the lid 432 longitudinally.

Figure 17:
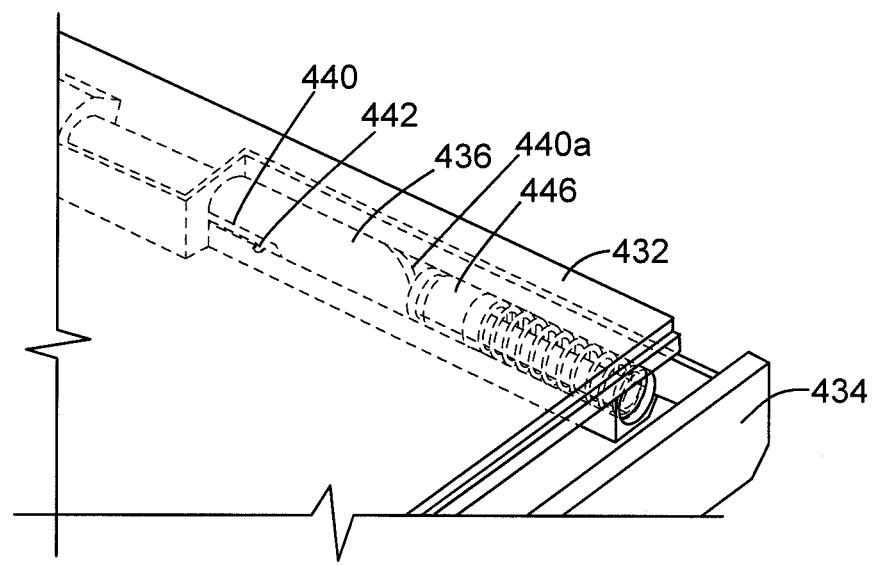
FIG. 17 is a partially transparent perspective view of a portion of another embodiment of a portable computing device in a partially open position.

After the lid 432 moves the first longitudinal distance, the lid 432 can be configured to then move a second longitudinal distance less than the longitudinal distance L4. A sum of the first and second longitudinal distances can substantially equal the longitudinal distance L4. The first and second longitudinal distances can be substantially equal such that the lid 432 can be configured to move substantially half of the longitudinal distance L4 automatically, e.g., via the sliding and release mechanisms, and substantially half of the longitudinal distance L4 manually, e.g., via hand movement of the lid 432. FIG. 17 shows the lid 432 having moved the first longitudinal distance before moving the second longitudinal distance. If the first and second longitudinal distances are substantially equal, as in the illustrated embodiment. Hinged movement of the lid 432 relative to the base 434 can cause the lid 432 to move the second longitudinal distance relative to the base 434. The torque shaft can be configured to rotate relative to the cam 442 to allow the cam 442 to move within the groove 440 formed in the torque shaft. The torque shaft can therefore be configured to move longitudinally and rotatably about a longitudinal axis thereof to effect longitudinal movement of the lid 432. In contrast, in an embodiment in which a cam only moves in a linear portion of a groove formed in a torque shaft, e.g., in the embodiment illustrated in FIGS. 8-16, the torque shaft can be configured to only move longitudinally, e.g., without rotation, to effect longitudinal movement of a lid.

As in the illustrated embodiment, a length of the spiral portion of the groove 440 can be equal to the second longitudinal distance. The cam 442 and the groove 440 can therefore cooperate to allow the central latitudinal axis 432A of the lid 432 and the display to be coaxially aligned with the central latitudinal axis A5 of the alphanumeric keypad 414a when the lid 432 is hingedly opened to a maximum extent. When the lid 432 is hingedly opened, the cam 442 can be configured to abut a terminal end of the spiral portion of the groove 440, such as at a right-most end of the groove 440 as in the illustrated embodiment, thereby defining the maximum extent to which the lid 432 can be hingedly opened. As in this illustrated embodiment, the cam 442 can therefore be configured to move within both the linear portion and the spiral portion of the groove 440.

Because the lid 432 can continue to move longitudinally after the bias element 444 has applied its stored force to the torque shaft, an empty space or distance D can be formed between facing ends of the torque shaft, e.g., an end of the torque limiter 446, and the bias element 444, as shown in FIGS. 19 and 20. In contrast, if hinged movement of a lid relative to a base does not cause longitudinal movement of the lid, facing ends of a bias element and a torque limiter can abut one another when a display and a keyboard are optimally aligned, e.g., in the embodiment illustrated in FIGS. 12 and 13.

The device 400 can include a second cam (obscured in FIGS. 17-21) and a second groove 440a formed in the torque shaft, e.g., in the rod 436. The second groove 440a can be configured to engage the second cam and can include a linear portion and a spiral portion similar to the other groove 440. The second cam and the second groove 440a can help provide redundancy for the device 400 in case of failure of one of the cams and/or one of the grooves.

When the device 400 is closed, e.g., when the lid 432 and the base 434 are moved from the open configuration to the closed configuration, the lid 432 can generally move longitudinally in reverse to that discussed above. Generally, the lid 432 can move the second longitudinal distance by being hingedly moved, e.g., hingedly moved down toward the base 434, and then the lid 432 can move the first longitudinal distance via the sliding mechanism.

Although the invention has been described by reference to specific embodiments, a person skilled in the art will understand that numerous changes may be made within the spirit and scope of the inventive concepts described. A person skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A device, comprising:
a lid including a display on an inner surface thereof, the lid having a longitudinal side and a latitudinal side;
a base including a keyboard on an inner surface thereof, the base having a longitudinal side and a latitudinal side, the base and the lid being hingedly connected along the longitudinal sides such that the lid and the base can be moved between a closed configuration and an open configuration, the keyboard including an alphanumeric keypad and a numeric keypad, the numeric keypad being located to a side of the alphanumeric keypad in a longitudinal direction; and
a sliding mechanism configured to automatically mechanically move the lid in a longitudinal direction relative to the base in response to the lid and the base being moved between the open and closed configurations, the sliding mechanism being configured to automatically mechanically move the lid in the longitudinal direction between a first position in which a central latitudinal axis of the display is offset from a central latitudinal axis of the alphanumeric keypad and a second position in which the central latitudinal axis of the display is coaxial with the central latitudinal axis of the alphanumeric keypad, wherein
the sliding mechanism comprises a torque shaft having a groove formed therein, a cam configured to move within the groove, and a bias element configured to move between a compressed configuration and an expanded configuration,
wherein the bias element moving from the compressed configuration to the expanded configuration causes the cam to move within the groove in a first direction and causes the lid to move from the first position to the second position, and
wherein the bias element moving from the expanded configuration to the compressed configuration allows the cam to move within the groove in a second direction opposite to the first direction and allows the lid to move from the second position to the first position.

2. The device of claim 1, wherein the groove includes a linear portion extending linearly along the torque shaft, and the cam is configured to move within the linear portion in the first and second directions.

3. The device of claim 1, wherein the groove includes a spiral portion that spirals around an exterior surface of the torque shaft, and the cam is configured to move within the spiral portion in the first and second directions.

4. The device of claim 1, further comprising a push button configured to be manually pushed to move the bias element from the compressed configuration to the expanded configuration.

5. A device comprising:
a lid including a display on an inner surface thereof, the lid having a longitudinal side and a latitudinal side;
a base including a keyboard on an inner surface thereof, the base having a longitudinal side and a latitudinal side, the base and the lid being hingedly connected along the longitudinal sides such that the lid and the base can be moved between a closed configuration and an open configuration, the keyboard including an alphanumeric keypad and a numeric keypad, the numeric keypad being located to a side of the alphanumeric keypad in a longitudinal direction; and a sliding mechanism configured to automatically mechanically move the lid in a longitudinal direction relative to the base in response to the lid and the base being moved between the open and closed configurations, the sliding mechanism being configured to automatically mechanically move the lid in the longitudinal direction between a first position in which a central latitudinal axis of the display is offset from a central latitudinal axis of the alphanumeric keypad and a second position in which the central latitudinal axis of the display is coaxial with the central latitudinal axis of the alphanumeric keypad, further comprising a release mechanism configured to move between a locked configuration and a released configuration, the release mechanism being in the locked configuration when the lid and the base are in the closed configuration, and the release mechanism being in the released configuration when the lid and the base are in the open configuration, wherein when the lid and the base are moved from the closed configuration to the open configuration, the release mechanism is configured to move from the locked configuration to the released configuration to cause the sliding mechanism to automatically mechanically move the lid in the longitudinal direction relative to the base.

6. The device of claim 5, wherein the release mechanism comprises a protrusion configured to be disposed within an opening formed in the base when the release mechanism is in the locked configuration and configured to be released from the opening when the release mechanism is in the released configuration.

7. The device of claim 6, wherein the release mechanism further comprises a link shaft having the protrusion extending therefrom, the link shaft being configured to slide within the base to move the protrusion between being disposed within the opening and being released from the opening.

8. The device of claim 7, wherein the release mechanism further comprises a push button configured to be manually pushed to slide the link shaft within the base and move the lid and the base from the closed configuration to the open configuration.

* * * * *